(No Model.)

E. PABST.
MILK CAN.

No. 359,401. Patented Mar. 15, 1887.

ATTEST:
J. H. Mundle
Oscar Haase.

INVENTOR:
Ernst Pabst
By R. Sum
Attorney

UNITED STATES PATENT OFFICE.

ERNST PABST, OF HANOVER, GERMANY.

MILK-CAN.

SPECIFICATION forming part of Letters Patent No. 359,401, dated March 15, 1887.

Application filed June 9, 1886. Serial No. 204,657. (No model.) Patented in England May 12, 1886, No. 6,406.

*To all whom it may concern:*

Be it known that I, ERNST PABST, a subject of the Emperor of Germany, residing in Hanover, Germany, have invented certain new and useful Improvements in Milk-Cans, of which the following is a specification.

My invention relates to a novel construction of milk-cans, which will mix the milk and cream when opening the faucet leading therefrom.

Heretofore milk-cans have been made of a simple inclosure provided with a faucet or stop-cock on the wall near the bottom thereof. This form of can and others similar thereto are filled with milk. The upper portion or surface of the milk forms a thick rich cream, which the consumer does not get until the upper surface shall have reached the level of the faucet, at which time it will flow freely through when the faucet is opened therefor.

Now, the object of my invention is to provide means that will enable the dealer to give the purchaser a portion of the rich cream mixed with the milk, which is preferable in all cases where pure and rich milk is desired.

My invention consists of a milk-can provided with a vertically-fixed tube on the interior thereof, said tube provided with perforations beginning at the base thereof and extending therefrom to its top and the stop-cock connected with the base of said tube, all of which will be more fully described hereinafter.

Figure 1:
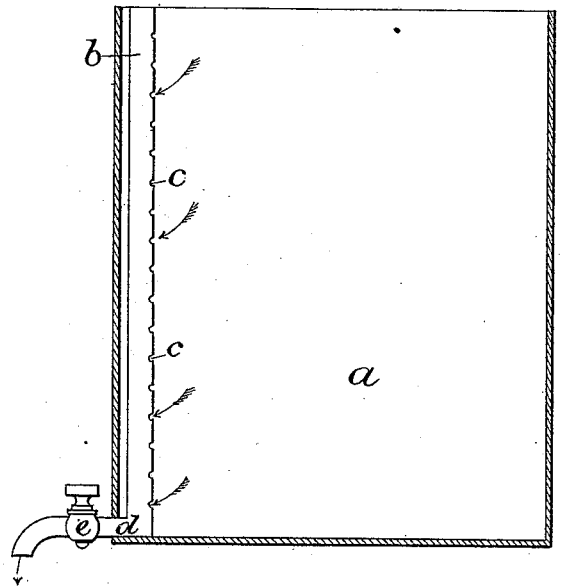
Figure 2:
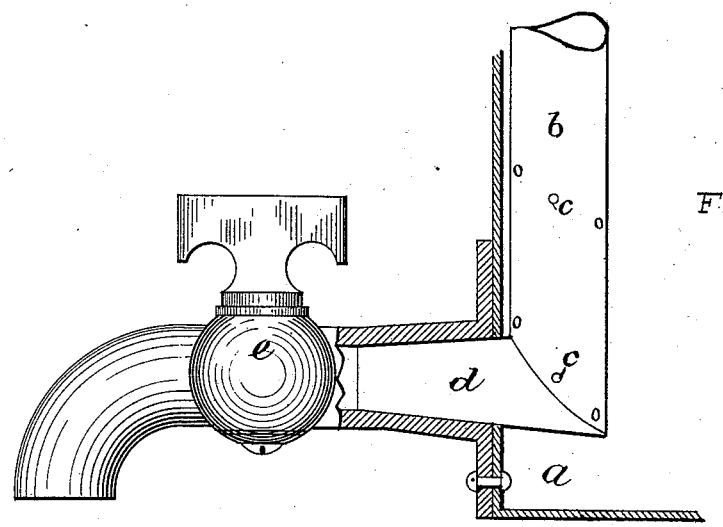

In the drawings, Figure 1 represents a vertical section of an ordinary milk can or vessel in which is shown the vertically-arranged perforated tube connected with a stop-cock near the bottom of said can. Fig. 2 represents a detail view of a portion of the can and tube, in which is shown the perforation or holes arranged spirally upon the tube.

Similar letters refer to similar parts throughout the drawings, in which—

*a* represents the milk can or vessel having therein the vertically-arranged tube *b*, provided with the perforations *c c*. The lower end, *d*, of the tube *b* is connected with a stop-cock or faucet, *e*.

*Modus operandi.*—The perforations *c c* are of equal size, and thus the level of the milk in the tube *b* and vessel *a* remains in the ordinary state at all times the same. The level of the milk inside of the tube will therefore sink when tapping or drawing off milk through the cock *e*. The equilibrium of pressure inside and outside of the tube *b* becomes destroyed, and each and every perforation *c* will cause the milk to begin a certain movement or play under the influence of the altered pressure, which of course corresponds with the difference between the pressure inside of the tube *b* and that inside of the can or vessel *a*.

I am aware that cream-mixers have heretofore been made with movable tubes therein; but these tubes require adjustment and considerable manipulation, which, however, is overcome by the invention herein set forth.

I am aware that oil-cans have heretofore been made with a series of stop-cocks arranged on the wall of the vessel; but this construction, however, would not perform the operation for which my invention is intended.

Having thus described my invention, what I claim as new, and desire to secure by Letters Patent, is—

The combination, with the milk-can *a*, of the vertically-fixed tube *b*, arranged on the interior of said milk-can *a*, said tube provided with perforations *c*, beginning at the base thereof and extending therefrom to its top, and the stop-cock *e*, arranged at the base of said tube *b*, substantially as shown and described.

In witness whereof I have hereunto signed my name in the presence of two subscribing witnesses.

Hanover, May 1, 1886.

ERNST PABST.

Witnesses:
 HERM. RËYSS,
 JOHN KRACKE.